Sept. 11, 1945. W. A. RIDDELL 2,384,639
HIGH SPEED SHUTTER
Filed Sept. 23, 1942

William A. Riddell
INVENTOR
BY
ATTORNEYS

Patented Sept. 11, 1945

2,384,639

UNITED STATES PATENT OFFICE 2,384,639

HIGH-SPEED SHUTTER

William A. Riddell, Rochester, N. Y., assignor to Eastman Kodak Company, Rochester, N. Y., a corporation of New Jersey Application September 23, 1942, Serial No. 459,403

8 Claims. (Cl. 95—60)

This invention relates to photography and more particularly to shutters for photographic cameras. One object of my invention is to provide a shutter of the so-called between-the-lens type with which exposures of extreme rapidity can be made even with comparatively long-focus lenses. Another object of my invention is to provide a shutter of the type described with which a single extremely fast exposure can be made, which exposure may be, if desired, amplified by a high speed flash so that the shutter may be used either with or without daylight.

There have been recently introduced on the market lamps, such as the Edgerton vapor discharge lamp, which produce extremely rapid flashes and which provide sufficient illumination for an objective having a comparatively small effective opening to give a fully exposed negative. Such lamps may give an exposure, for instance, of between $\frac{1}{15000}$ and $\frac{1}{30000}$ part of a second. Such lamps are beginning to be quite widely used for action pictures indoors and they are also very desirable to supplement daylight where extremely rapid exposures are desired and daylight is insufficient out of doors.

One of the difficulties in making exposures out of doors in conjunction with these lamps is that few shutters can give a sufficiently fast exposure to eliminate unwanted daylight when used with the flash lamp. Moreover, the action of the shutter blades must be very carefully synchronized so that the flash will take place at the moment the shutter blades are fully opened.

While of course I can alter the single speed of a shutter constructed in accordance with the present invention without too great difficulty, since I am only employing a single fast exposure, I prefer to provide a shutter which will give an exposure of approximately $\frac{1}{600}$ of a second. Such a shutter is rapid enough for most action pictures out of doors when the flash is not used and such an exposure may also be satisfactorily used with a flash under most light conditions. The size of the shutter of course has a great deal to do with the rapidity of the exposure, but it is possible to provide a shutter of the type which will be described for long focal length lenses, such as 20 inches if necessary, because such lenses may be used with a very small stop—say f.22—when a flash lamp is used. If it is necessary to produce a somewhat faster exposure, a more powerful spring may be used, or if the exposure is found to be too fast a less powerful spring may be employed.

Coming now to the drawing wherein like references denote like parts throughout:

Figure 1:
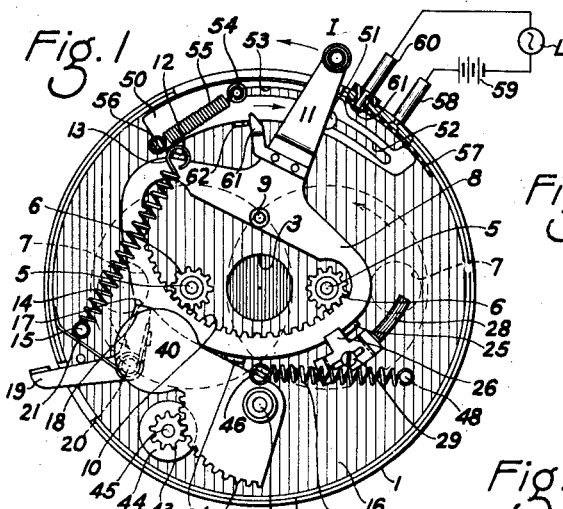
Fig. 1 is a front plan view of a shutter constructed in accordance with and embodying a preferred form of my invention, the shutter cover having been removed to disclose the mechanism.

It will be noticed that the shutter shown in the drawing is an extremely simple one with very few moving parts, this being found necessary in order to obtain the required speeds with a shutter of this type.

Figure 2:
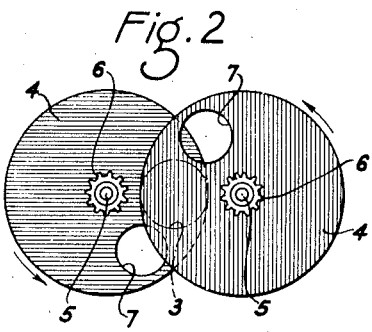
Fig. 2 is a front plan view of the shutter blades in the position they assume just before an exposure is to be made.

My preferred form of shutter may consist of a shutter casing 1 having an upstanding flange 2 about the periphery and a central aperture 3 through which exposures may be made. The central aperture 3 is normally covered by a pair of disk-shaped shutter blades 4, each mounted on pivots 5 which also carry small pinions 6. Each shutter blade is provided with an exposure opening 7 which I prefer to make circular in form as shown in Fig. 2, particularly where extremely rapid exposures are to be made.

If the shutter does not require such a high speed, or if the shutter is to be made in smaller sizes, the round opening 7 may be elongated into arcuate openings such as are well known in disk types of shutters to somewhat increase the length of the exposure without decreasing the speed of travel of the shutter blades. I prefer to make the shutter blades of the shape shown in Fig. 2 so that they can be balanced and so that they may be freely turned about their respective pivots.

In order to simultaneously move the shutter blades I provide a master member 8 pivoted at 9 to the shutter casing and including a gear rack or segment 10 having teeth meshing with the teeth of the two pinions 6. The master member includes a setting handle 11 and an upstanding lug 12 which engages one end 13 of a power spring 14 attached to a pin 15 on the mechanism plate 16. Thus, when the handle 11 is moved in a clockwise direction to position I, the parts are ready to make an exposure and the shutter blades 4 are in the position shown in Fig. 5 in which it will be noticed the apertures 7 are placed at approximately 180° from the exposure aperture 3, the reason for this being that the shutter blades 4 may gain momentum and reach a high speed before they pass the exposure aperture 3.

The master member includes a latch element 17 which may be engaged by a latch member 18 forming a trigger 19 pivoted on a stud 20 and turned by the spring 21 in a clockwise direction so as to engage the master member. Thus with the parts positioned in Fig. 1, by depressing the trigger 19, the trigger is moved to its Fig. 3 position and the master member moves from the I position toward position II where the blades start to open after the shutter blades have begun to move rapidly and pass on through this position to position II in which the shutter blades have finally come to rest after an exposure.

With the parts moving at such a high speed it is necessary to provide some means for stopping the shutter blades without too great a shock to the shutter parts. To accomplish this, I provide a pair of upstanding lugs on the master member, lugs 24 and 25. These lugs swing through an arc about the pivot 9 and are adapted to strike a shock absorber 26 in the form of a shoe, since it includes downwardly turned lugs 27 which engage a slot 28 in the mechanism plate 16 so that the shoe will slide through an arcuate path. The freedom of movement of the shoe is controlled by a screw 29 engaging a spring member 30 on the underside of the mechanism plate 16. Thus, as the master member moves between the II and III positions, the lug 24 will engage the arm 26 and drive the shoe through an arcuate path slowing up the master member from the moment the shutter blades pass the exposure aperture 3 until it reaches the III position. Thus the parts will be stopped without the shock and rebound which would otherwise occur. Since in setting the shutter the apertures 7 of the leaves must again cross the exposure aperture 3, I provide a cover blind 40 which may turn on a stud 41 and which includes teeth 42 meshing with a pinion 43 carried by the flywheel 44 mounted on the stud 45. The cover blind is attached at 46 to a spring 47, also attached at its opposite end to a pin 48 carried by the mechanism plate. This spring is adapted to normally hold the cover blade against the stop pin 49 in the position shown in Fig. 4.

When the shutter is set the following operations occur. First, the setting handle 11 is moved from the III to the I position and in doing this the master member spring 14 is placed under tension. When the master member reaches the Fig. 1 position the trigger latch element 18 engages the master member latch element 17 to hold it in a set position. As the master member is moved, lug 24 moves away from the shock absorber lug 26 and lug 25 approaches this member finally engaging it and shoving the slidable shoe through the slot 28 from the Fig. 4 position to the Fig. 1 position.

Figures 4, 5:
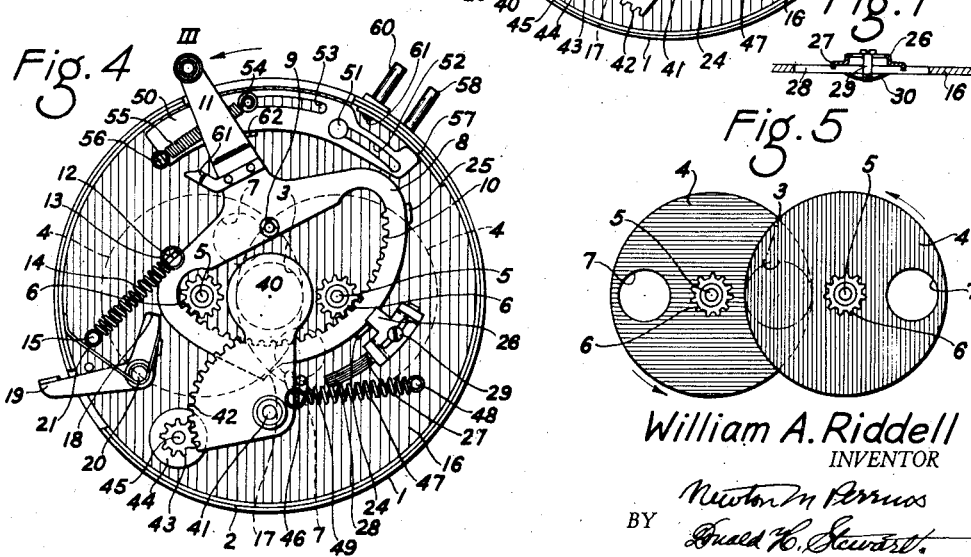
Fig. 4 is a view similar to Figs. 1 and 3 but with the parts in the position they assume after an exposure has been made.
Fig. 5 is a view similar to Fig. 2 showing the shutter blades in a set position ready to make an exposure.
Figure 7:
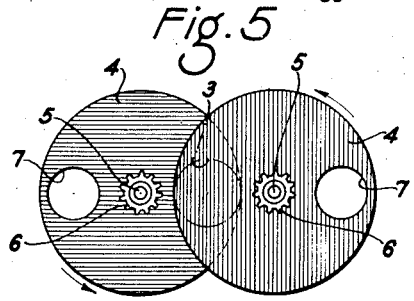
Fig. 7 is a fragmentary detail section through a shock absorber.

This operation also causes the lug 24 to engage the cover blade 40, swinging it from its Fig. 4 position to the Fig. 1 position. In this position the aperture 3 has been uncovered, but this aperture is covered by the shutter blades 4. The shutter is now ready for an exposure, and by depressing the trigger 19 the master member is released. It starts to swing under the impulse of the spring 14, starting the shutter blades relatively slow but rapidly increasing their speed as the master member swings about its pivot 9. After the apertures 7 swing past the aperture 3 the master member and blades come to rest. However, since the blades swing quite fast and the cover blade 40 swings very slowly because of its flywheel gear retard, the cover blade does not reach the exposure aperture 3 until after an exposure has been made. Therefore, it does not interfere with the exposure but it nevertheless reaches a position in which it will cover the aperture during the time the shutter blades are moved in starting the setting operation, as it will be noticed that the master member 3 may be swung quite a distance in a clockwise direction from its III position before the lug 24 moves far enough to engage the cover blade.

Since it is necessary to carefully regulate and synchronize the time of a flash with shutter blades which can move rapidly enough to make a 1/600 of a second exposure, I prefer to build in a synchronizing device which may be constructed as follows. A switch member 50 may be slidably mounted as by a pin 51 and slot 52 connection on a mechanism plate 16. There is also a second slot 53 in the switch member through which a pin 54 passes, this pin carrying one end of a spring 55 which is also attached at 56 to a lug carried by a switch member. This spring, therefore, tends to move the switch member in the direction shown by the arrow in Fig. 1 into a position in which the switch element 50 lies in an inoperative position on the insulated pad 57. The shutter casing 1 is attached to one plug 58 forming with a battery 59 a part of a circuit including a flash lamp L, the other part of the circuit including the plug 60. A contact 61 is carried on the inside of the insulating pad 57 and when the element 50 strikes this contact the circuit is made and the lamp L will be fired. In order to move the switch member in synchronized relation with the master member, I provide the master member with a spring arm 61 which engages an upstanding lug 62 on the slide contact 50 so that, as the master member swings, the spring arm 61 engages this lug and swings the contact with it.

Figure 3:
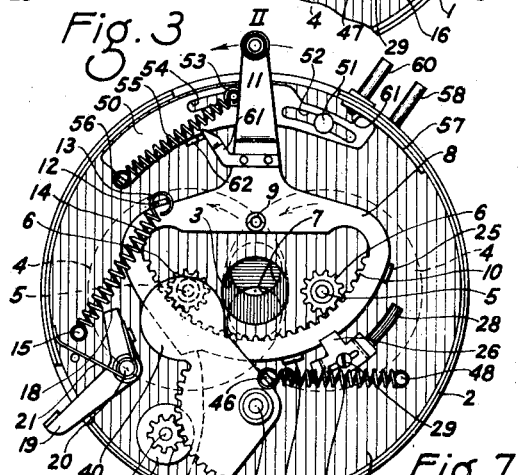
Fig. 3 is a view similar to Fig. 1 with the shutter blades just about to open to produce an exposure.

It will be noticed from Fig. 3 that the shutter leaves are about to fully open and contact is about to be made between the switch element 50 and the contact 61. Thus the moment the shutter blades are fully opened this contact will be made and the flash will always occur when the shutter blades are exactly at their fully opened position.

As the master member swings beyond its II position (Fig. 3), the spring lever 61, because it is turning about the pivot 9, slips off of the upstanding lug 62 on the switch element 50 just after the circuit has been made. As soon as this occurs the spring 55 immediately returns the switch element 50 to its normal inoperative position shown in Fig. 4. When the shutter is again set, the spring arm 61 of the master member rides up and snaps over the lug 62 when the shutter is fully set, as indicated in Fig. 1, from which position the parts may again move to make an exposure.

Figure 6:
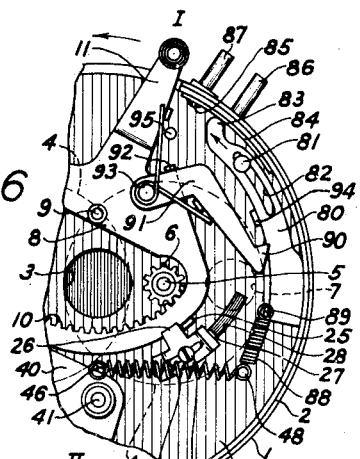
Fig. 6 is a fragmentary plan view with the shutter cover removed of a second embodiment of my invention.

In Fig. 6 I have provided a slightly different embodiment of my invention, the difference being in the switch operating mechanism. In this embodiment the switch slide 80 may move about a pin 81 extending through the slot 82 and the slide carries a switch member 83. This switch member normally rides on the insulated pad 84, but when it reaches the contact 85 it makes the circuit through the plugs 86 and 87. A spring 88 encircling a lug 89 on the slide 80 and a pin 46 holds the slide in the position shown in Fig. 6. The slide also carries an upstanding lug 84 in the fall of a hook 90 carried by a latch element 91 spring pressed in the position shown against a lug 92 and pivotally mounted on a stud 93.

When the parts move from the I position to make an exposure in the counterclockwise direction, the master member 8 carries the latch 91 in the relative position shown in Fig. 1 until a pin 95 strikes the latch, kicking it off of a lug 94. This occurs as soon as or just after contact is made between the contact members 89 and 85. Thus, as before, the master member 8 may continue on to finish the exposure while the slide member 80 is returning to its initial or inoperative position. Then when the shutter is again set the hook 90 will snap over the lug 94. The reason for wishing the contact to return before the master member is that, since this movement occurs before the shutter is set, there is no danger of discharging the lamp which may have again been charged by the operator. Of course it is possible to use the ordinary flash light lamp if the shutter is properly adjusted to compensate for the lag occurring between the making of the circuit and the flashing of the foil filled type of lamp. Some of the more modern lamps require only a very few milliseconds while more of the older variations require a considerably greater lag, so that it would only be possible to use such a lamp if my shutter has been initially designed for this purpose. This shutter is primarily intended for the extremely rapid lamps of the discharge type referred to above.

The operation of the shutter is extremely simple. To make an exposure the lever 11 is moved to the I position shown in Fig. 1 in which the master member is set, the cover blade is removed from the exposure aperture and the shock absorber is moved to its operative position. The trigger 19 is then depressed, releasing the master member which rapidly turns the shutter blades to make an exposure until it strikes the shock absorber which reduces the speed of the master member and the shutter blades gradually bringing the moving parts to a stop after the exposure has been completed.

Since the master member carried the switch contact with it, and since the contact is arranged to make a circuit discharging the lamp L when the blades are in the proper position if a flash is used, it is properly synchronized. The master member swings about a shorter radius than that of the switch slide and it, therefore, slips off the slide, permitting it to return to its initial position as soon as the circuit is completed. Thus, in resetting the shutter, there is no danger of action discharging the lamp, nor is it necessary for the operator to remember which operation to perform next.

I claim:

1. In a shutter for cameras the combination with an apertured casing, of pivotally mounted shutter blades mounted in the casing and adapted to cover and uncover the exposure aperture, pinions on the shutter blades, a master member including a pivotally mounted gear segment meshing with said shutter blade pinions and having a setting handle thereon, a shock absorber in the path of the master member and positioned to be struck thereby after said master member has moved the shutter blades to make an exposure whereby said master member and said shutter blades may be gradually brought to rest, said shock absorber comprising a friction shoe riding in an arcuate guideway adjacent the path of the master member to be engaged by said member after a predetermined travel of the master member in an exposure making direction.

2. In a shutter for cameras the combination with an apertured casing, of pivotally mounted shutter blades mounted in the casing and adapted to cover and uncover the exposure aperture, pinions on the shutter blades, a master member including a pivotally mounted gear segment meshing with said shutter blade pinions and having a setting handle thereon, a shock absorber in the path of the master member and positioned to be struck thereby after said master member has moved the shutter blades to make an exposure whereby said master member and said shutter blades may be gradually brought to rest, said shock absorber comprising a friction shoe riding in an arcuate guideway adjacent the path of the master member, a pair of lugs carried by the master member one on each side of the shock absorber, one lug being positioned to retard the master member by moving the shock absorber in one direction while making an exposure and the other lug positioned to move the shock absorber to a set position as the master member is moved to set the shutter.

3. In a shutter for cameras, the combination with an apertured casing, of pivotally mounted shutter blades carried by the casing and adapted to cover and uncover the exposure aperture, pinions on the shutter blades, a master member including a pivotally mounted gear segment meshing with said shutter blade pinions and having a setting handle thereon, a cover blind pivotally mounted in the casing to move to and from an operative position covering the exposure aperture, a spring tending to hold the cover blind in an operative position, means for delaying movement of the cover blind when moved by the spring towards its operative position, a lug on the master member positioned to engage and move the cover blind to its inoperative position during the last part of the setting movement of the master member and to hold the cover blind in an inoperative position, a trigger for holding the master member in a set position, the release of the trigger causing the master member to rapidly rotate the shutter blades in moving to make an exposure and to release the lug from the cover blind holding position whereby the cover blind may be delayed by its delaying means as it moves toward its operative position.

4. In a shutter for cameras, the combination with an apertured casing, of pivotally mounted shutter blades carried by the casing and adapted to cover and uncover the exposure aperture, pinions on the shutter blades, a master member including a pivotally mounted gear segment meshing with said shutter blade pinions and having a setting handle thereon, a cover blind pivotally mounted in the casing and movable to and from an operative position covering the exposure aperture, a spring for holding the cover blind over the aperture of the casing, means for delaying movement of the cover blind under the influence of its spring, a lug on the master member for swinging the cover blind to and holding the cover blind in an inoperative position when the master member is moving towards its set position, a trigger for holding the master member in its set position and through the master member lug also holding the cover blind in an inoperative position.

5. In a shutter for cameras, the combination with an apertured casing, of pivotally mounted shutter blades carried by the casing and adapted to move to cover and uncover the exposure aperture, pinions carried by the shutter blades, a master member including a pivotally mounted gear segment meshing with the shutter blade pinions and having a setting handle thereon, a trigger for holding the master member in a set position, a cover blind pivotally mounted in the casing and movable to and from an operative position covering the exposure aperture, a spring tending to move the cover blind over the aperture of the casing, mechanism for delaying movement of the cover blind, a lug on the master member for swinging the cover blind from its operative position after the master member has moved a portion of the distance moved in setting the shutter and the shutter leaves have been moved thereby past the exposure aperture, said lug also holding the cover blind in an inoperative position when the master member is in a set position.

6. A high speed shutter for cameras comprising, in combination, a shutter casing having an exposure aperture therein, a pair of pivotally mounted shutter leaves carried by the casing and normally closing the exposure aperture, each blade including an opening through which light is admitted through the exposure aperture when said leaves are moved, a master member operably connected to said leaves for driving said leaves upon their pivots causing the openings therein to simultaneously cross the exposure aperture, a handle connected to the master member for setting said master member, a trigger movably mounted in the shutter casing for holding the master member in a set position, a cover blind pivotally mounted in the shutter casing and spring held to block light through the exposure aperture, a cover blind delay mechanism for retarding movement of the cover blind, said master member including means for moving the cover blind from its light blocking position during the last part of the setting movement of the master member, said means also holding the cover blind from the exposure aperture while the shutter is set.

7. A high speed shutter for cameras comprising, in combination, a shutter casing having an exposure aperture therein, a pair of pivotally mounted leaves carried by the shutter casing and normally closing the exposure aperture and each shutter leaf including an opening through which light may be admitted through the exposure aperture, a movably mounted master member operably connected to the shutter leaves for driving said leaves upon their pivots causing the openings therein to simultaneously cross the exposure aperture, a handle for moving the master member to a set position, a trigger for holding the master member in a set position, a cover blind pivotally mounted in the casing and normally spring held to block light through the exposure aperture, a cover blind delay mechanism for retarding movement of the cover blind, said master member including means for moving the cover blind from its light blocking position during the last part of the setting movement of the master member, said means being so positioned that said master member may move the shutter blade openings past the exposure opening before the cover blind spring moves said cover blind to the exposure opening, the means for moving the cover blind also holding said cover blind away from a light blocking position when the shutter is set.

8. A high speed shutter for cameras comprising, in combination, a shutter casing having an exposure aperture therein, a pair of pivotally mounted leaves carried by the shutter casing and normally closing the exposure aperture, each shutter blade including an opening through which light may be admitted through the exposure aperture, a settable and movably mounted master member operably connected to said shutter leaves for driving said leaves upon their pivots causing the openings therein to simultaneously cross the exposure aperture, a cover blind pivotally mounted and spring held to block light through the exposure aperture, a cover blind delay mechanism for retarding movement of the cover blind, said master member including a lug for engaging and setting the cover blind moving it from its exposure blocking position against the action of its spring, said lug holding said cover blind from its exposure blocking position when the shutter is set, a trigger for holding the master member in a set position and for releasing the shutter, the cover blind delay mechanism delaying the movement of the cover blind towards its closed position until after the shutter blades have completed their exposure.

WILLIAM A. RIDDELL.